UNITED STATES PATENT OFFICE.

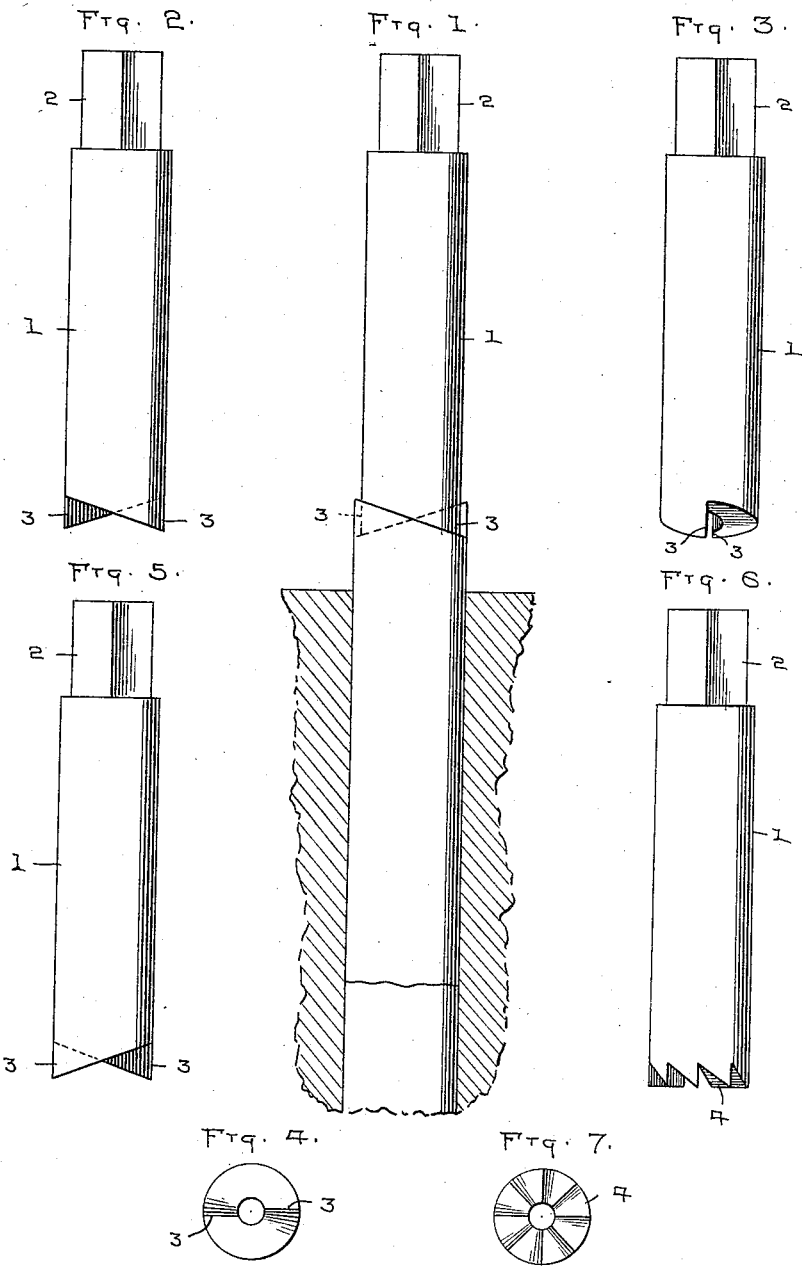

ARTHUR H. TALLYN, OF BENSON, ILLINOIS.

COMBINATION BOLT EXTRACTOR AND HOLDER.

1,179,680.  Specification of Letters Patent.  Patented Apr. 18, 1916.

Application filed March 25, 1915. Serial No. 16,995.

*To all whom it may concern:*

Be it known that I, ARTHUR H. TALLYN, a citizen of the United States, residing at Benson, in the county of Woodford and State of Illinois, have invented certain new and useful Improvements in Combination Bolt Extractors and Holders; and I do hereby declare the following to be a full, clear, and exact description of the invention, such as will enable others skilled in the art to which it appertains to make and use the same.

My invention relates to new and useful improvements in combination bolt extractor and holder and my object is to provide a device whereby a bolt or screw may be removed when the head is broken therefrom. And a further object is to so construct the device that the same may be used in connection with braces for turning the screws or bolts into as well as remove the same from an object. And a further object is to so construct the device that it can be used for holding the bolt while a nut is being attached thereto or removed therefrom.

Other objects and advantages will be hereinafter set forth and more particularly pointed out in the acompanying specification.

In the accompanying drawings which are made a part of this application, Figure 1 is an elevation of the device as applied to use. Fig. 2 is a similar view of the device removed from operation. Fig. 3 is a similar view of a slightly modified form of the device. Fig. 4 is an end elevation of the preferred form of the device. Fig. 5 is a side elevation of the device constructed for reverse action to the form shown in Fig. 2. Fig. 6 is a similar view showing a further modified form of the device, and Fig. 7 is an end elevation thereof.

Referring to the drawings in which similar reference numerals designate corresponding parts throughout the several views, 1 indicates the body of the device which is preferably elongated and has at one end a squared shank 2 to adapt the same to be received in the usual or any preferred form of brace (not shown). The opposite end of the body 1 is cut at various angles to form projecting teeth 3, one-half of the diameter of the body being preferably disposed at one angle and the opposite half at a diametrically opposite angle to form two teeth on the end of the body, but as shown in Figs. 6 and 7 of the drawings a plurality of teeth 4 may be provided if desired. Instead of making the base of the teeth in a straight line as shown in Figs. 1 and 2, they may be rounded or beveled as shown in Fig. 3 of the drawings.

In Fig. 5 of the drawings, the angle of the teeth is diametrically opposite to that shown in Figs. 1 and 2, and this form of tool can be used for turning the screw into the object or for removing screws or bolts having left hand threads.

In applying the device to use, notches are filed in the end, either in the head or projecting end of the bolt with which engages the teeth of the tool and by directing pressure on the tool and turning at the same time, the bolt will be positively operated to remove the same or to enter the bolt or screw into the object. It can also be engaged with the head of the bolt to hold the same against rotation, while the nut is being turned thereon or removed therefrom, the pressure on the tool causing the teeth to engage the bolt with sufficient firmness to hold the bolt against rotation as long as the tool is held rigid.

Instead of using the tool in connection with a brace, a wrench may be applied to the squared shank 2 to turn the tool.

This device can be very cheaply constructed by forming the same of suitable steel and by properly tempering the same it will be practically indestructible from use. And it will also be seen that the device may be used for extracting bolts or screws under all conditions as the tool can be introduced into an opening and engage a portion of the screw embedded in an object, should the same become broken off at a point below the surface of the object. It will likewise be seen that the device can be readily used for holding the bolt against rotation when the nut is being applied to or removed therefrom and that it can be used for turning the screw into an object when so desired.

What I claim is:—

1. A combined bolt extractor and holder comprising a body having a pair of teeth at one end, each tooth occupying substantially one-half the diameter of the end of the body portion, the faces of the teeth extending axially of the body being vertical and the bottom faces thereof being flat and resting at an oblique angle to the trend of the body while a line intersecting said faces at any point in their length at right angles to their trend will be at right angles to the longitudinal plane of the body, said bottom faces extending in an uninterrupted straight plane from one side of the body to the other, the plane of said bottom faces intersecting and crossing each other at the axial center of the body.

2. A bolt extractor having a body and a pair of teeth on the end thereof, the vertical wall of each tooth extending outwardly from the center of the body and gradually increasing in depth, each tooth being defined by obliquely cutting away the body from side to side, the plane of the cut away portion of one tooth intersecting the cut away portion of the other tooth at the axial center of the body.

In testimony whereof I have signed my name to this specification in the presence of two subscribing witnesses.

ARTHUR H. TALLYN.

Witnesses:
JACOB ROTH,
FRANK HARMS.

Copies of this patent may be obtained for five cents each, by addressing the "Commissioner of Patents. Washington, D. C."